United States Patent
Bert

(10) Patent No.: US 8,539,218 B2
(45) Date of Patent: *Sep. 17, 2013

(54) SYSTEMS AND METHODS FOR USING AN INSTALLATION SCRIPT TO CREATE A HIDDEN BOOT PARTITION TO INSTALL A BOOTABLE VIRTUAL STORAGE APPLIANCE ON A VIRTUALIZED SERVER PLATFORM

(75) Inventor: Luca Bert, Cumming, GA (US)

(73) Assignee: LSI Corporation, Milpitas, CA (US)

( * ) Notice: Subject to any disclaimer, the term of this patent is extended or adjusted under 35 U.S.C. 154(b) by 478 days.

This patent is subject to a terminal disclaimer.

(21) Appl. No.: 12/995,225

(22) PCT Filed: Jun. 9, 2009

(86) PCT No.: PCT/US2009/046712
§ 371 (c)(1),
(2), (4) Date: Nov. 30, 2010

(87) PCT Pub. No.: WO2010/008707
PCT Pub. Date: Jan. 21, 2010

(65) Prior Publication Data
US 2011/0078433 A1    Mar. 31, 2011

Related U.S. Application Data

(60) Provisional application No. 61/135,231, filed on Jul. 17, 2008.

(51) Int. Cl.
G06F 1/24       (2006.01)
G06F 15/177   (2006.01)

(52) U.S. Cl.
USPC .............................................. 713/100; 713/2

(58) Field of Classification Search
USPC ....................................................... 713/100, 2
See application file for complete search history.

(56) References Cited

U.S. PATENT DOCUMENTS
2002/0178351 A1*   11/2002  Ott ................................. 713/2
2008/0092134 A1*   4/2008   Zhang et al. ................. 717/174

* cited by examiner

*Primary Examiner* — Thomas Lee
*Assistant Examiner* — Robert Cassity

(57) ABSTRACT

One embodiment is a method for installing a virtual storage appliance on a host server platform. One such method comprises: providing an installation package to a host server platform, the installation package comprising an installation script for installing an I/O virtual machine (IOVM), an IOVM boot console, and an IOVM management module; running the installation script to create a hidden boot partition on a boot disk and copy the IOVM boot console and the IOVM management module to the hidden boot partition; rebooting the host server platform; loading the IOVM boot console and the IOVM management module from the hidden boot partition; configuring a disk array via the IOVM management module; for each disk in the array, creating a hidden boot partition and replicating the IOVM boot console and the IOVM management module; and installing a virtual storage environment using the IOVM boot console as a storage driver.

14 Claims, 14 Drawing Sheets

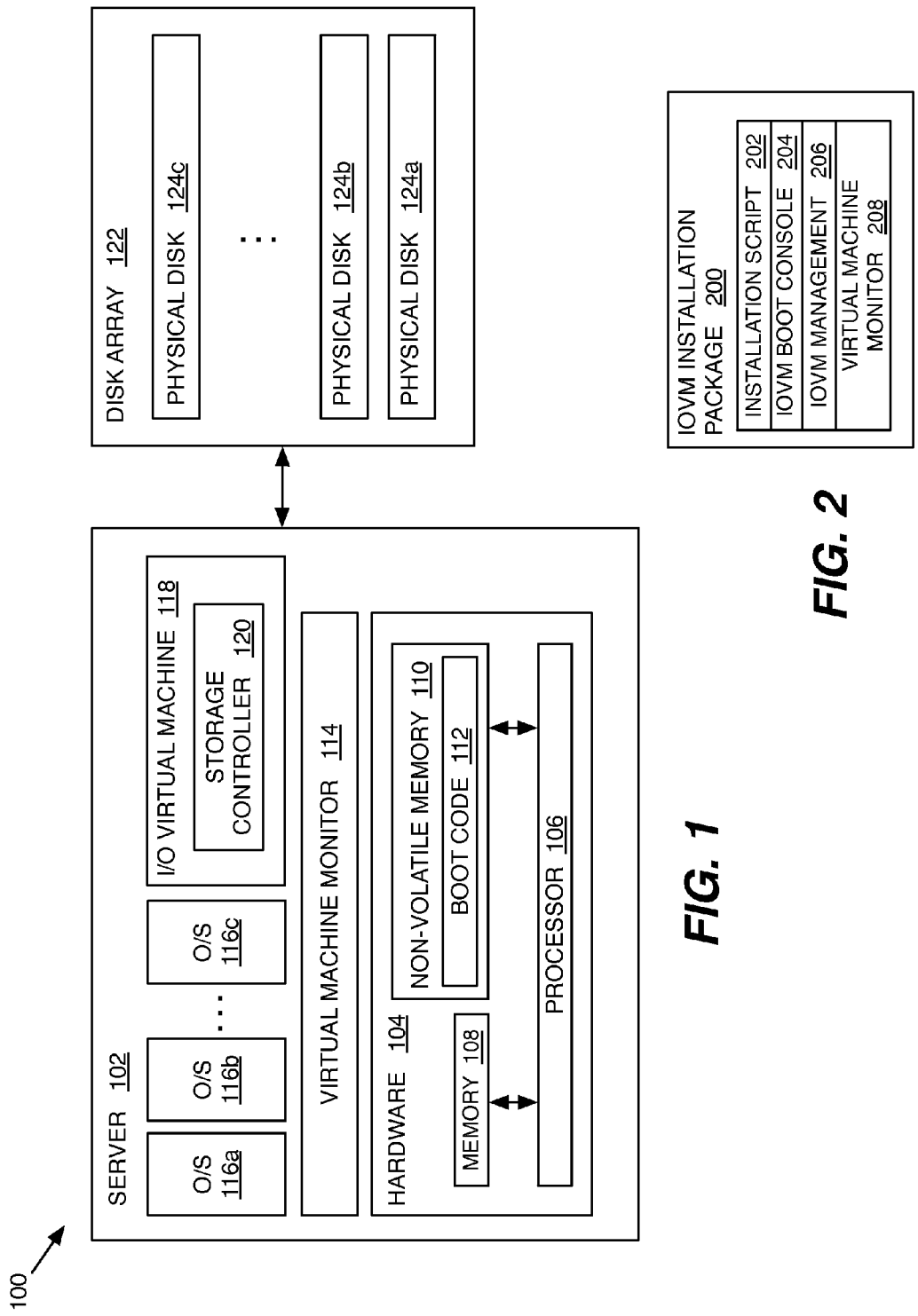

SYSTEMS AND METHODS FOR USING AN INSTALLATION SCRIPT TO CREATE A HIDDEN BOOT PARTITION TO INSTALL A BOOTABLE VIRTUAL STORAGE APPLIANCE ON A VIRTUALIZED SERVER PLATFORM

CROSS-REFERENCE TO RELATED APPLICATIONS

This application claims the benefit of the priority of U.S. Provisional Patent Application Ser. No. 61/135,231, filed Jul. 16, 2008, and entitled "Method to Install and Boot a Virtual Appliance that Owns Boot Devices," which is hereby incorporated by reference in its entirety.

FIELD OF THE INVENTION

The invention generally relates to computer data storage and, more particularly, to virtual storage appliances and a virtual machine monitor (VMM) environment on a server platform.

BACKGROUND

Computer networks for use in a business environment continue to require more storage. Typically, such enterprises employ a centralized data storage system, and the computer network includes various personal computers, laptops, etc. that communicate over the network with the data storage system. The data storage system typically includes a server platform that controls the storage of information on and the retrieval of information from dedicated data storage resources, such as hard disk drives, magnetic or optical disks, and/or a storage area network (SAN). The server platform typically includes a storage controller that manages the physical disk drives and presents them to the server platform as logical units.

In one solution, the storage controller comprises a hardware implementation of the Redundant Array of Independent Disks (RAID) standard. RAID is a storage solution that provides storage reliability from lower-cost components via a technique of arranging the storage devices into arrays for redundancy. In general, the hardware RAID implementation employs dedicated hardware that divides and replicates data among multiple storage devices, but the array is seen by the server platform as one single disk. While this implementation provides a lower-cost option, the solution still requires the use of dedicated hardware that may be undesirably expensive in certain situations.

As processing power has increased, it has become more common to implement the storage controller in software rather than dedicated hardware. For example, currently there are a number of software RAID implementations in which the RAID logic is part of the operating system of the server platform. These solutions can significantly decrease overall cost and dependence on a specific hardware platform. However, software implementations have significant drawbacks in situations in which the server platform also supports multiple execution environments (e.g., multiple emulated operating systems) via virtualization.

Another significant limitation of software RAID implementations is that they need to be configured for each supported operating system, which may add cost and inconvenience to development, debugging, and deployment. In some cases, such as derivatives of Linux, there may be further complications related to the disclosure of source course code based on the terms of the open source licenses (e.g., GNU General Public License, and others). These open source compliance issues may further add to the cost and inconvenience of implementing software RAID for such operating systems.

Virtualization technology enables a single host computer running a virtual machine monitor (VMM) to present multiple abstractions or views of the host, so that the underlying host hardware appears as one or more independently operating virtual machines (VMs). The VMM comprises a host program that allows the host computer to support multiple execution environments. Each VM may function as a self-contained platform that runs its own firmware, operating system, and/or software applications. The VMM manages allocation and virtualization of host resources to the VMs.

When combining software RAID or other software storage controllers as a virtual storage appliance in a VMM environment, there is a meaningful configuration challenge. For example, there are several complexities involved in installing and/or booting the virtual storage appliance in the VMM environment. In order to boot, the virtual storage appliance is required to be present on the platform. There are many available VMM environments, although each one is different. Existing solutions must be independently designed for each VMM environment, and the platform must be pre-configured for the particular VMM environment to be used, which creates meaningful logistic challenges. Booting a standard operating system, for example, without any virtualization is quite simple, with the system (e.g., BIOS, EFI) loading only a few modules. Typically, in this scenario, a boot loader and driver may be loaded before the O/S loader takes over and controls the process. In a VMM environment, however, this process is significantly more complex because the system has to load from the boot load all of the VMM environments, the host operating systems, and the virtual storage appliance (and accompanying storage control logic). Loading all of these components may require an image having as much as 10-100 MB, or more. Furthermore, the boot device is typically a RAID volume and, therefore, if the RAID engine is in the operating system, a RAID function is required to load it, which may involve burdensome recursive self-references.

An existing solution for attempting to address this problem involves using a RAID loader in the boot code. However, this comes at the cost of having to create another RAID stack, which has its own complexities. While large manufacturers may be able to qualify and maintain a RAID stack in EFI/BIOS, many customers will either be unable or unwilling to do so. Another solution for attempting to address this problem involves providing the entire VMM environment in the server platform's non-volatile memory. This, too, introduces another set of challenges. For example, the size of the code for the VMM environment may problematic. Furthermore, there are significant business challenges associated with distribution and/or maintenance of the VMM environment when the entire VMM environment is provided in the server platform's non-volatile memory.

Despite the many advantages of combining a virtual storage appliance in a VMM environment, there remains a need in the art for more cost-effective solutions and systems and methods for installing and/or booting a virtual storage appliance in a standard server platform, which is independent of the particular VMM environment and which may eliminate the need for pre-configuring the platform.

SUMMARY

Various embodiments of systems, methods, computer systems, and computer programs are disclosed for installing and/or booting a virtual storage appliance on a virtualized server platform. One embodiment is a method for installing a virtual storage appliance on a host server platform. One such method comprises: providing an installation package accessible by a host server platform, the installation package comprising an installation script for installing an I/O virtual machine (IOVM), an IOVM boot console, and an IOVM management module; powering up the host server platform and loading boot code; loading the installation package to run on top of the boot code; running the installation script to create a hidden boot partition on a boot disk and copy the IOVM boot console and the IOVM management module to the hidden boot partition; rebooting the host server platform and loading the boot code; loading the IOVM boot console and the IOVM management module from the hidden boot partition; configuring a disk array via the IOVM management module; creating a hidden boot partition and replicating the IOVM boot console and the IOVM management module, on each disk in the disk array; and installing a virtual storage environment using the IOVM boot console as a storage driver.

Another such method comprises: providing an installation package to a host server platform, the installation package comprising an installation script for installing an I/O virtual machine (IOVM), an IOVM boot console, and an IOVM management module; running the installation script to create a hidden boot partition on a boot disk and copy the IOVM boot console and the IOVM management module to the hidden boot partition; rebooting the host server platform; loading the IOVM boot console and the IOVM management module from the hidden boot partition; configuring a disk array via the IOVM management module; for each disk in the array, creating a hidden boot partition and replicating the IOVM boot console and the IOVM management module; and installing a virtual storage environment using the IOVM boot console as a storage driver.

BRIEF DESCRIPTION OF THE DRAWINGS

FIG. 1 is a block diagram illustrating an embodiment of a server platform on which a virtual storage appliance may be installed.

FIG. 2 is a block diagram illustrating an embodiment of an IOVM installation package that may be used to install a virtual storage appliance on the server platform of FIG. 1.

DETAILED DESCRIPTION

Figure 3:
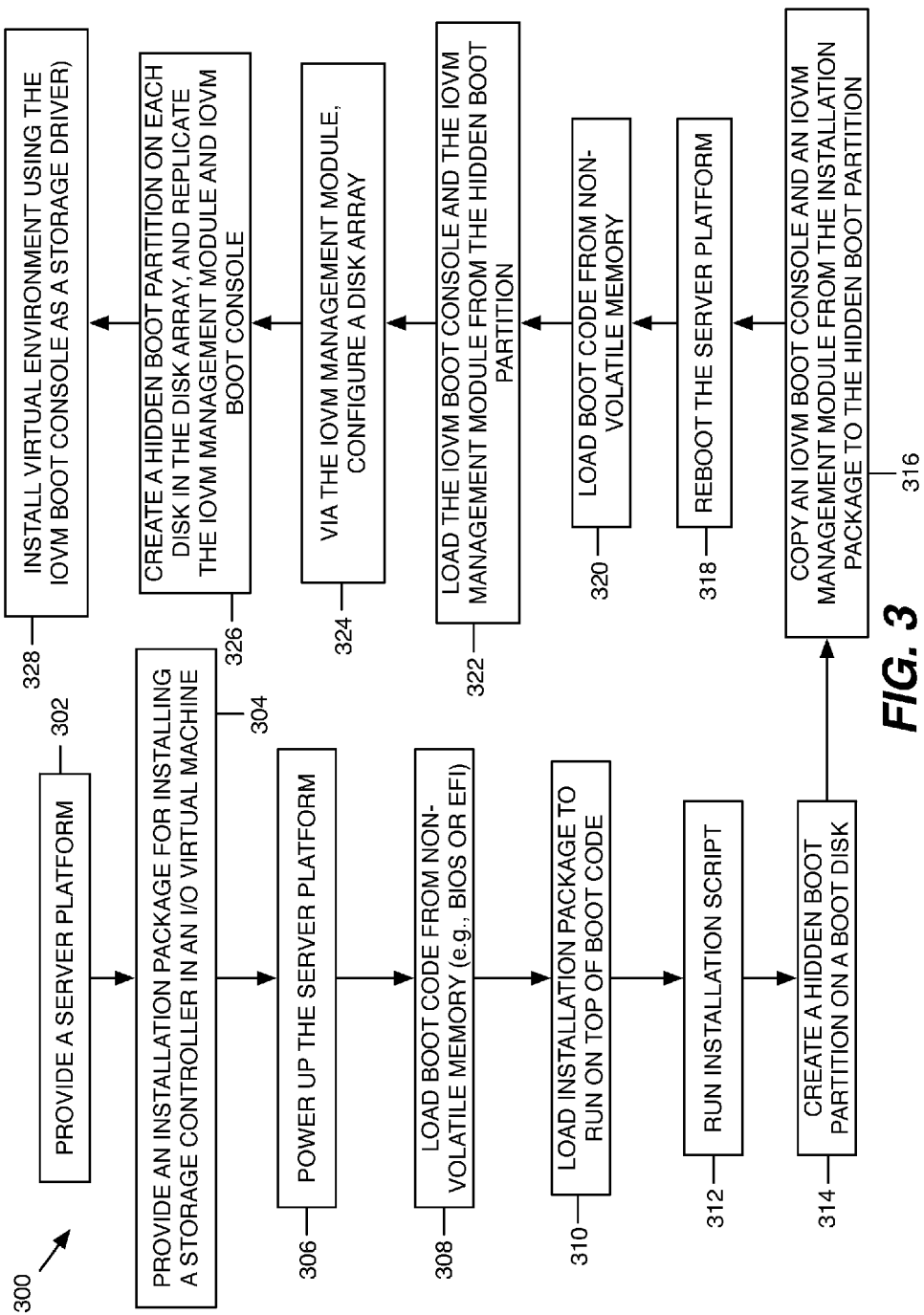
FIG. 3 is a flowchart illustrating an embodiment of a method for installing a virtual storage appliance on the server platform of FIG. 1 via the IOVM installation package of FIG. 2.

Various embodiments of systems, methods, and computer programs for installing and/or booting a virtual storage appliance on a server platform are disclosed. As an introductory matter and to illustrate the working environment in which the virtual storage appliance and server platform operate, FIG. 1 illustrates an exemplary computer system 100. Computer system 100 comprises a server platform 102 on which a virtual storage appliance may be installed and/or booted. In an embodiment, the server platform 102 comprises a standard, off-the-shelf server platform having hardware 104 that includes one or more processor(s) 106, memory 108, and non-volatile memory 110 containing boot code 112. It should be appreciated that processor(s) 106, memory 108, non-volatile memory 110, and boot code 112 may be pre-configured on the server platform 102 and used to perform the installation and booting processes described below. Therefore, it should be further appreciated that the other illustrated components in FIG. 1 represent components that are loaded by the server platform 102 in accordance with the installation and boot processes described below with reference to FIGS. 2-15.

Boot code 112 comprises the code used by the server platform 102 to configure hardware 104 and start the operating system boot procedure. In an embodiment, the boot code 112 may be configured to load, for example, a BIOS environment, an EFI environment, or other boot environment.

The virtual machine monitor 114 comprises a hypervisor or a thin software layer that is used to isolate hardware 104 from the virtual machine environment. The VMM 114 controls the execution of one or more service virtual machines associated with independent operating systems (e.g., OS 116a, 116b, 116c) and a special-purpose guest virtual machine (i.e., I/O virtual machine 118). As described below in more detail, the IOVM 118 comprises a dedicated virtual machine configured to process I/O associated with disk array 122 comprising a plurality of physical disks 124. The IOVM 118 includes a storage controller 120 configured to store and retrieve data from the disk array 122. Processor(s) 106 perform the processing operations associated with the server platform 102, including the processing to support VMM 114, IOVM 118, O/S 116a-c, and any other software and/or firmware.

Having described the general operating environment of the server platform 102 and the IOVM 118, various embodiments of systems and methods will be described for installing the IOVM 118 on the server platform 102 with reference to FIGS. 3-11. FIG. 3 illustrates an embodiment of a method 300 for installing the IOVM 118 on the server platform 102. FIGS. 4-11 illustrate the installation process as a pre-boot process, with reference to components of the computer system 100. It should be appreciated that one or more of the process or method descriptions associated with the method 300 may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions described with reference to the flowchart of FIG. 3 and the system block diagrams of FIGS. 4-11 may be implemented in software or firmware that is stored in memory 108 or non-volatile memory 110 and that is executed by hardware 104 or any other processor(s) or suitable instruction execution system associated with the server platform 102. Furthermore, the logical functions may be embodied in any computer readable medium for use by or in connection with an instruction execution system, apparatus, or device, such as a computer-based system, processor-containing system, or other system associated with the server platform 102 that can fetch the instructions from the instruction execution system, apparatus, or device and execute the instructions.

Referring to FIG. 3, a server platform 102 (block 302) and an IOVM installation package 200 (block 304) are provided. In an embodiment, the server platform 102 may comprise a standard server (e.g., an OEM server) without any specialized components associated with a VMM or the IOVM 118. As illustrated in FIG. 2, in an embodiment, the IOVM installation package 200 comprises various components associated with installing the IOVM 118, such as, for example, an installation script 202, an IOVM boot console 204, an IOVM management module 206, and a VMM 208. The installation package 200 may be provided on a compact disk, a digital video disk, or a flash memory device that is accessible by the server platform 102. In other embodiments, the installation package 200 may be provided as an internal component to the server platform 102 (e.g., in memory 108, non-volatile memory 110, etc.). It should be appreciated that the components of the installation package 200 may be provided in one or more packages depending on the desired installation implementation. For example, the installation script 202, the IOVM boot console 204, and the IOVM management module 206 may be provided in one installation package, and the VMM 208 may be provided as a standard, off-the-shelf VMM installation package.

In this regard, it should be further appreciated that the installation package 200 and the installation method 300 may provide an installation scheme with various advantages. The installation scheme may be designed to work with any desirable current or future virtualization environments and/or VMMs 208. O/S specific installation procedures may be removed. Furthermore, the installation scheme may be adaptable to a standardized server platform.

Figure 4:
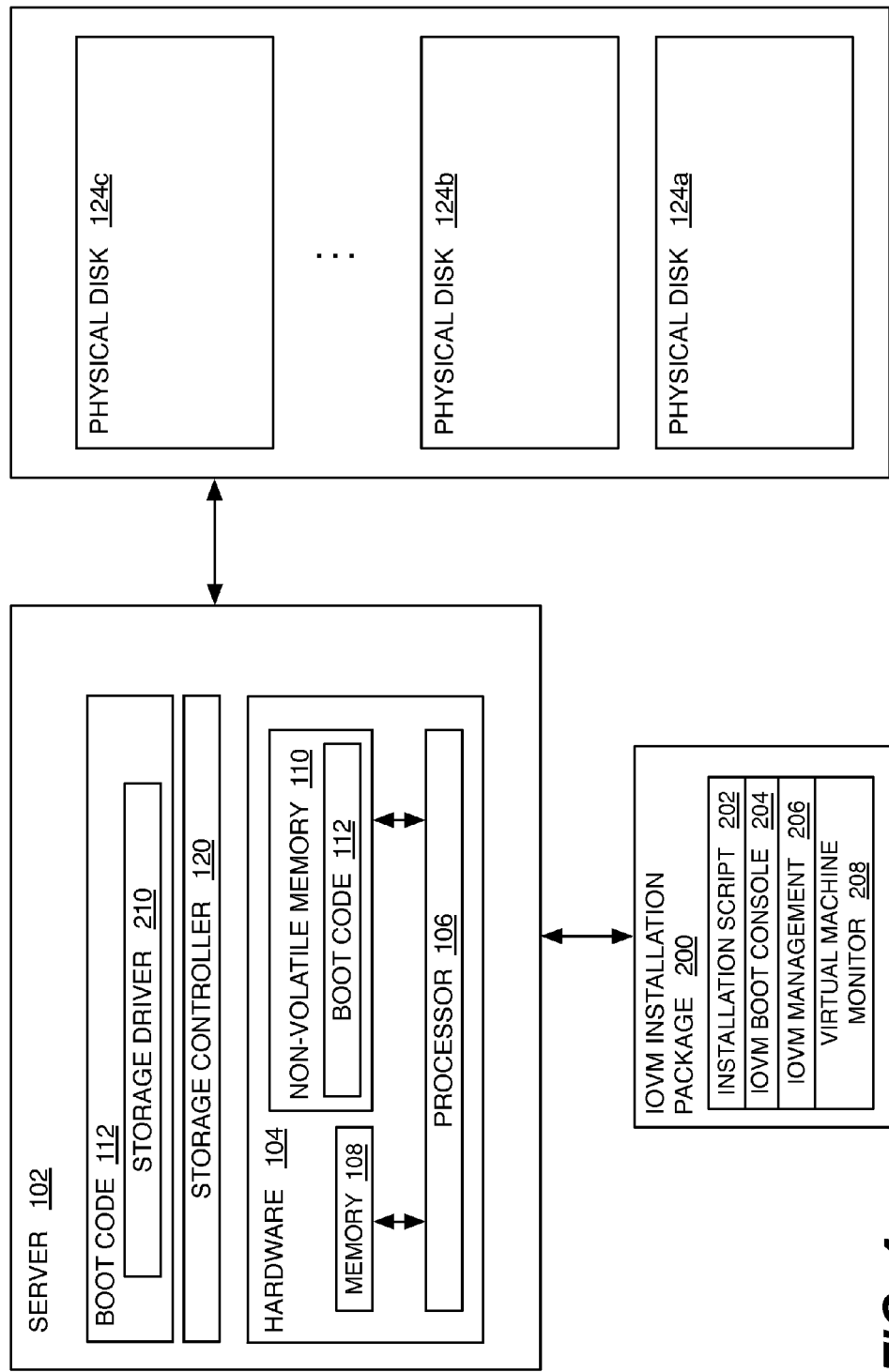
FIGS. 4-11 illustrate the operation of the server platform during the installation of the virtual storage appliance.
Figure 5:
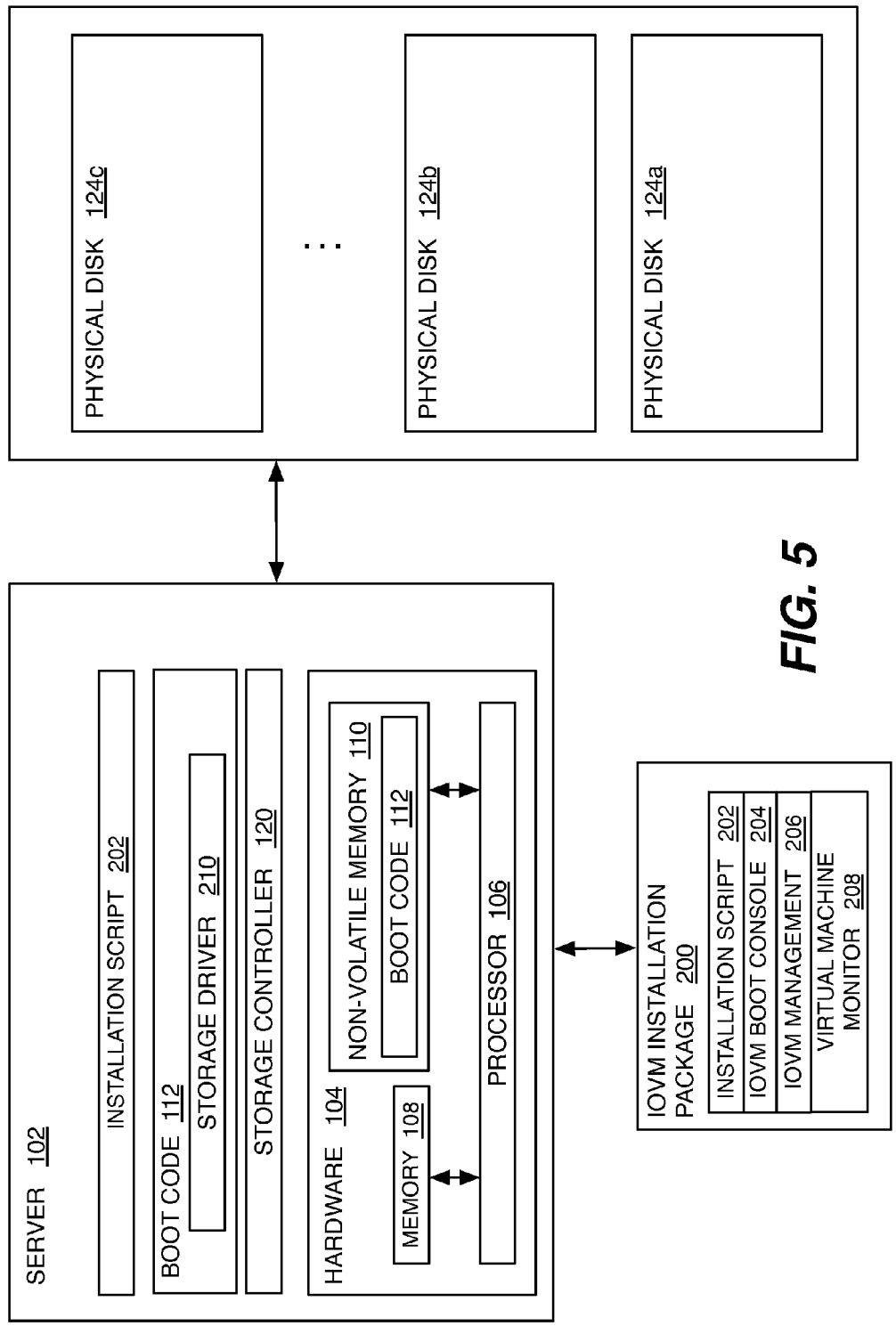

At block 306, the server platform 102 powers up. As illustrated in FIG. 4 and at block 308, after powering up, the boot code 112 from non-volatile memory 110 is loaded. The boot code 112 may be configured to load, for example, a BIOS environment, an EFI environment, or other boot environment. The boot environment may include a standard storage driver 210 compatible with a storage controller 120 on the server platform 102. In an embodiment, the storage driver 210 may comprise a SAS driver, and the storage controller 120 may comprise a SAS controller. One or ordinary skill in the art will appreciate, however, that other controllers and drivers may be used to implement other data transfer technologies, standards, and/or interfaces.

Figure 6:
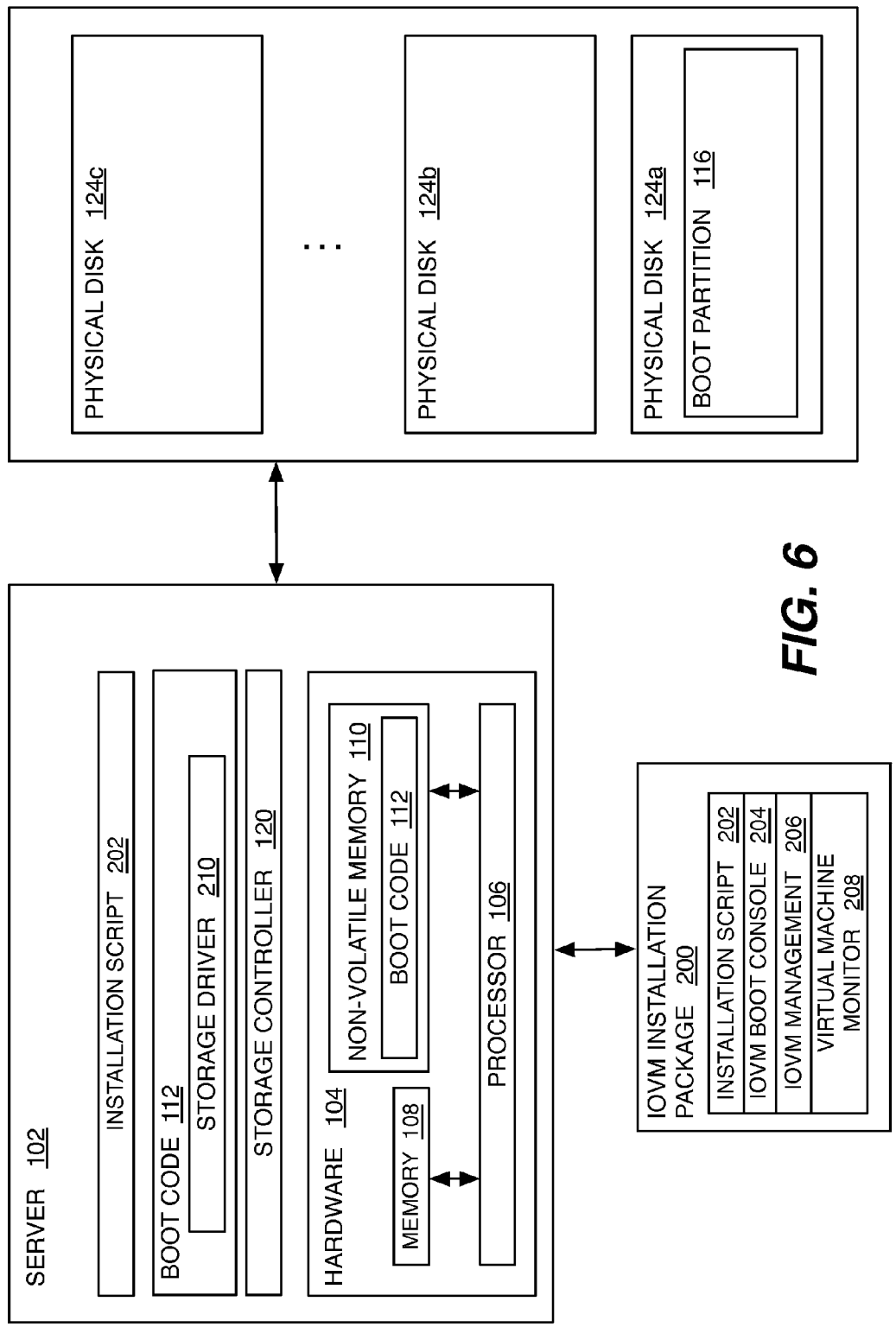
Figure 7:
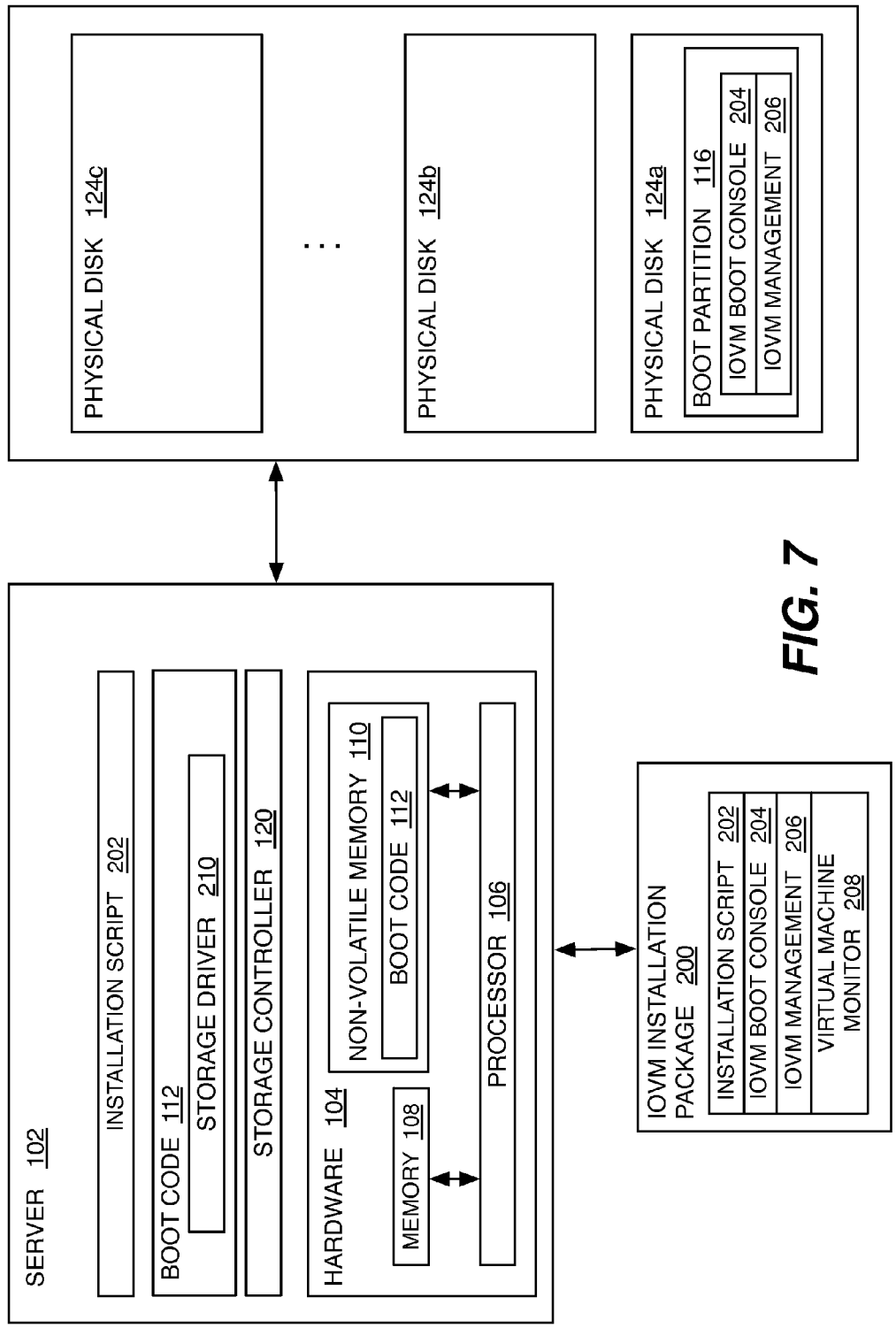

At block 310 (FIG. 5), the IOVM installation package 200 is loaded to run on top of the boot code 112. As illustrated in FIG. 6, at blocks 312 and 314, the installation script 202 is executed, and a boot partition is created on a boot disk. In the embodiment of FIG. 6, the boot disk comprises one of the physical disks 124 in the disk array 122 (i.e., physical disk 124a). The boot partition may be hidden from the system. For example, in RAID implementations, the boot partition may be hidden inside the Disk Data Format (DDF) space defined by the RAID standards or in any other private partition. At block 316 (FIG. 7), the installation script 202 may also copy the IOVM boot console 204 and the IOVM management module 206 from the IOVM installation package 200 to the boot partition 116. The boot partition 116 may be made bootable.

Figure 8:
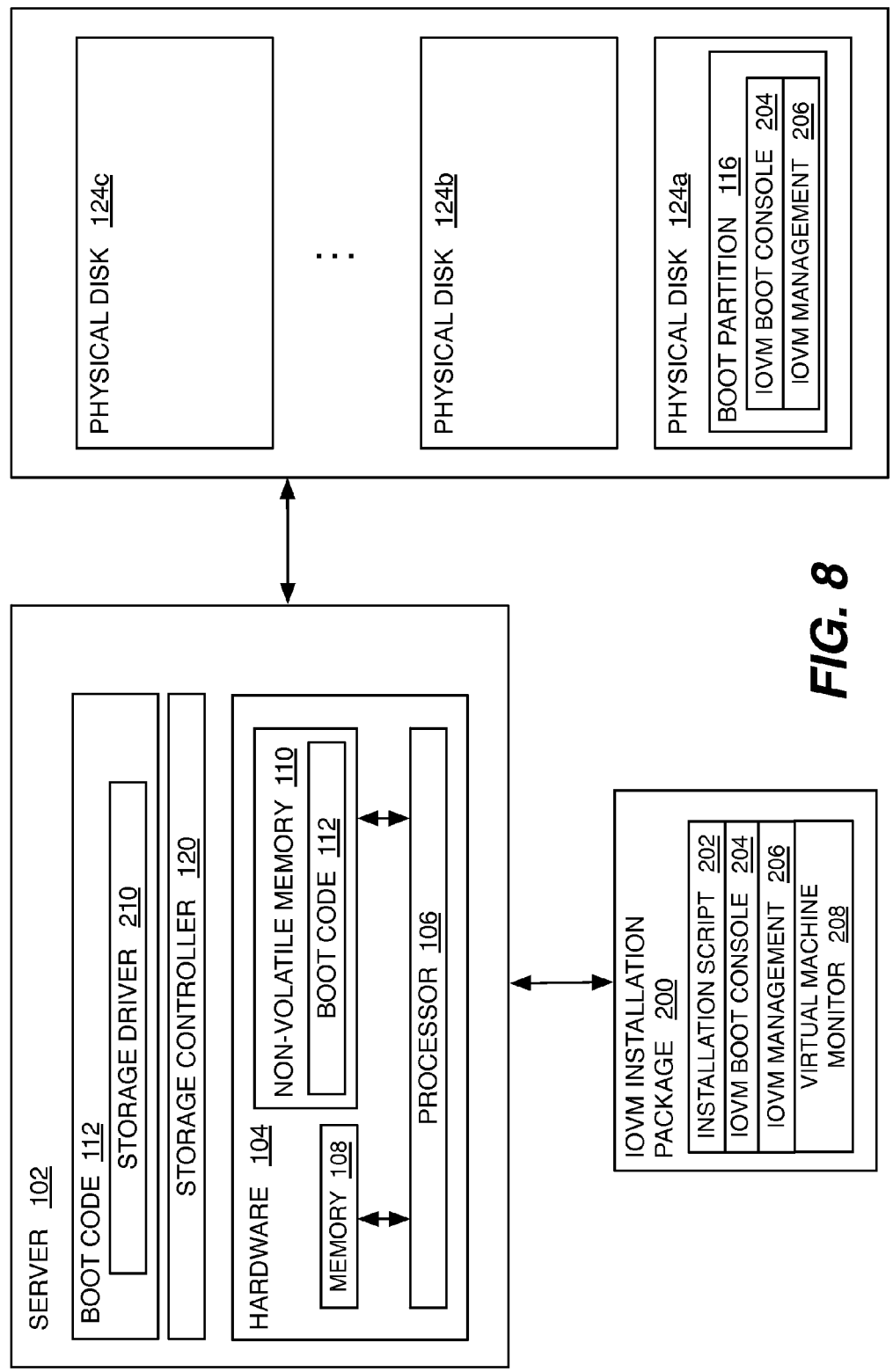
Figure 9:
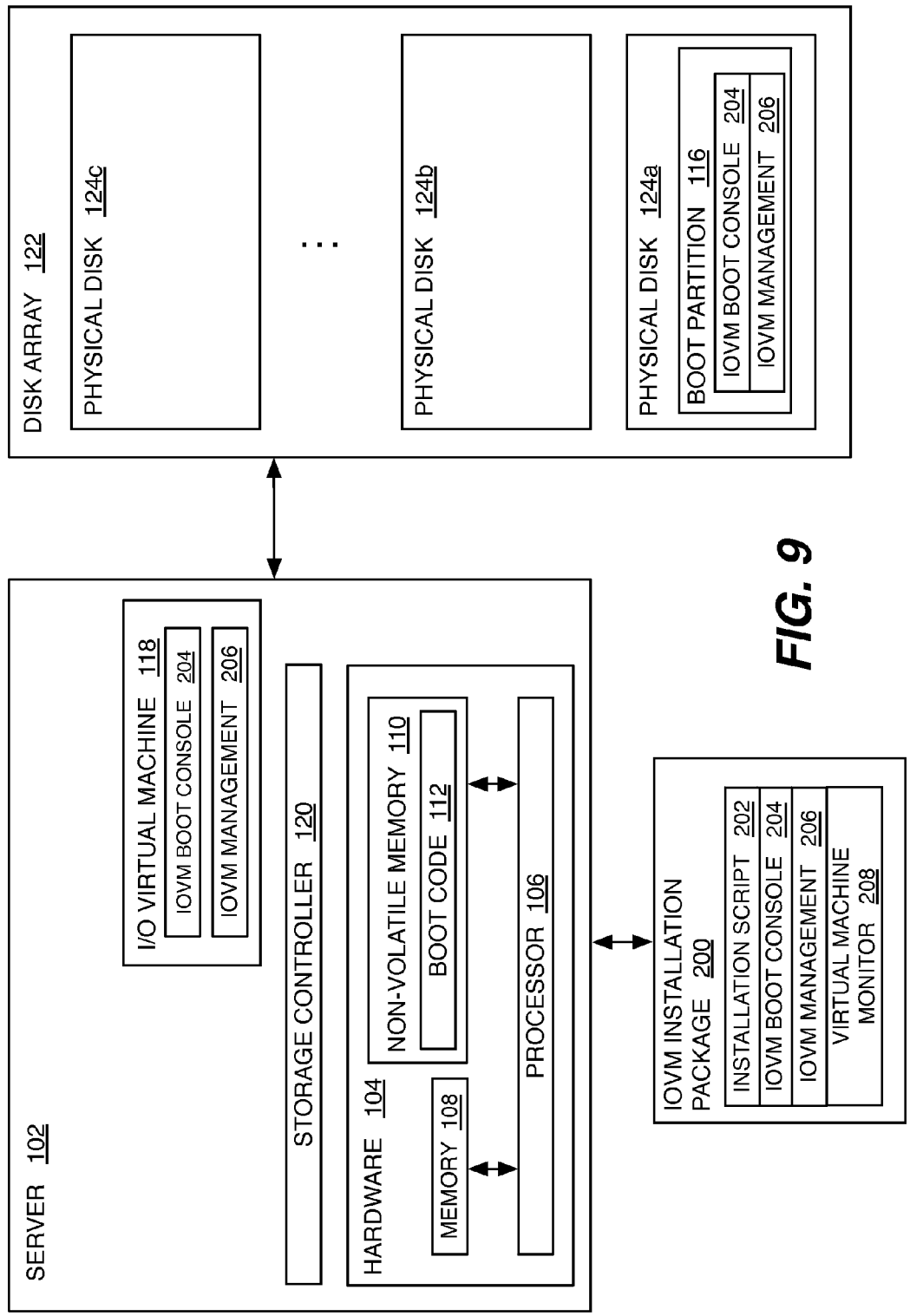
Figure 10:
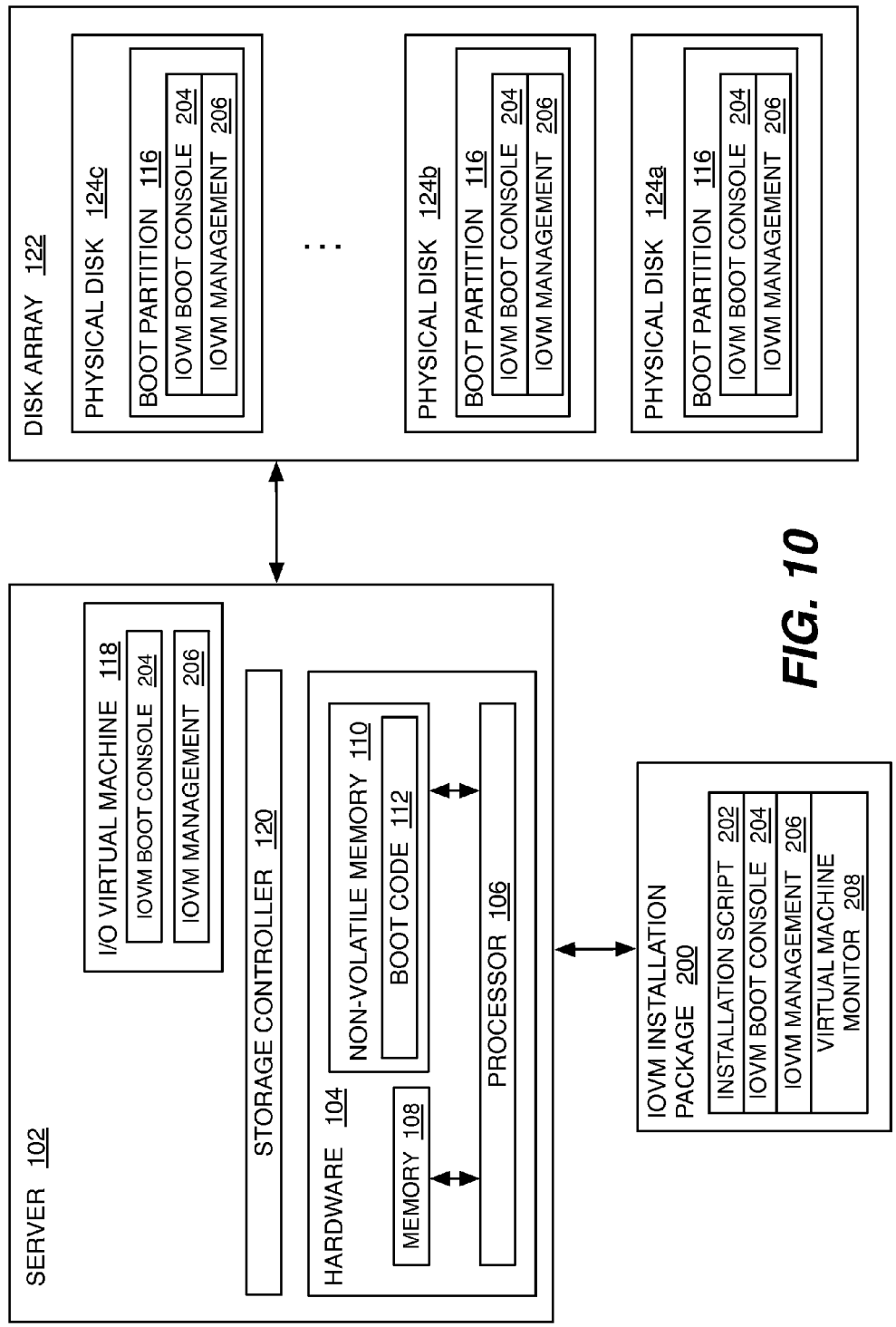
Figure 11:
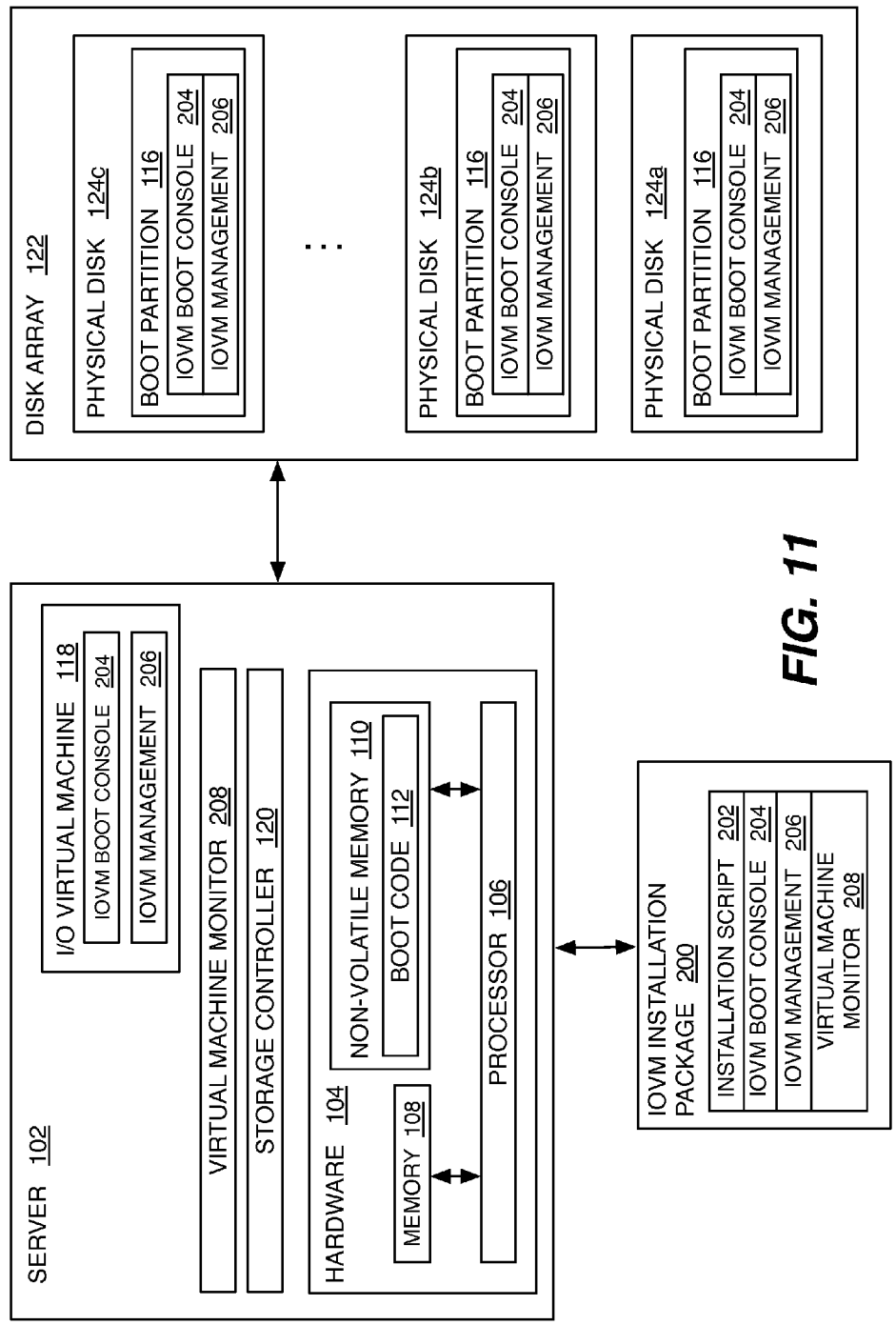

At block 318, the server platform 102 is rebooted and, as illustrated in FIG. 8, the boot code 112 is loaded from non-volatile memory 110 (block 320). At block 322 (FIG. 9), the IOVM boot console 204 and the IOVM management module 206 may be loaded from the boot partition 116 to the server platform 102. As described above, the IOVM 118 may comprise a dedicated OS-based guest virtual machine. Thus, an OS loader may take control from the boot environment and load the IOVM boot console 204 and the IOVM management module 206 from the boot partition 116. In an embodiment, the IOVM boot console 204 may comprise a standard operating system. Therefore, the IOVM boot console 204 may boot an operating system using standard procedures. It should be appreciated, however, that in computer system 100 the IOVM boot console 204 is configured for managing the storage virtualization (e.g., managing RAID logic).

At block 324, a user may interface with the IOVM management module 206 to configure the disk array 122. For example, the IOVM management module 206 may be configured to enable the user to create disk groups, virtual disks, volumes, etc. as desired. At block 326 (FIG. 10), the IOVM boot console 204 creates a hidden boot partition 116 on all disks in the disk array 122, in this case physical disks 124b and 124c. The IOVM boot console may also replicate the content of the boot disk (i.e., physical disk 124a) in the other boot partitions 116. It should be appreciated that this process enables a redundancy scheme that allows the computer system 100 to work in the event of the failure of physical disks 124 without the need, for example, for a RAID scheme. By replicating the content of the boot disk on all of the physical disks 124, the standard server boot process will boot from the first disk (i.e., physical disk 124a). If this disk fails, the boot process will attempt to boot from the second disk (i.e., physical disk 124b), and so on, thereby providing an N-way redundancy scheme.

Having installed the IOVM boot console 204 and configured the disk array 122, at block 328 (FIG. 11), the server platform 102 installs the virtual environment (e.g., VMM 208) using the IOVM boot console 204 as a storage driver. As mentioned above, the server platform 102 may support any desirable virtual environment. The virtual environment may be installed directly from the IOVM installation package 200 or from a standard OEM distribution installation package. The installation of the virtual environment may continue in a conventional manner.

Figure 12:
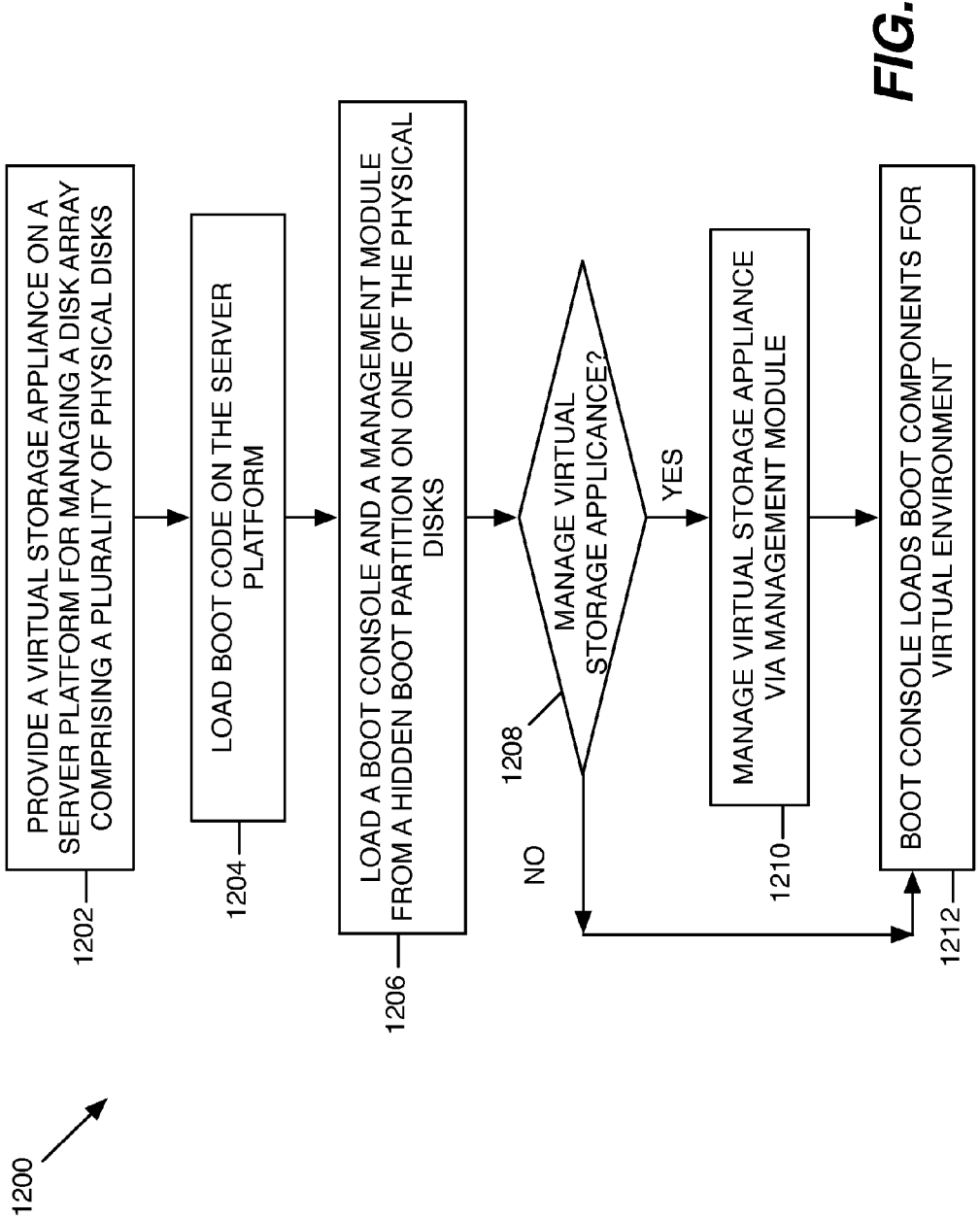
FIG. 12 is a block diagram of an embodiment of a server platform on which a virtual storage appliance has been installed.
Figure 13:
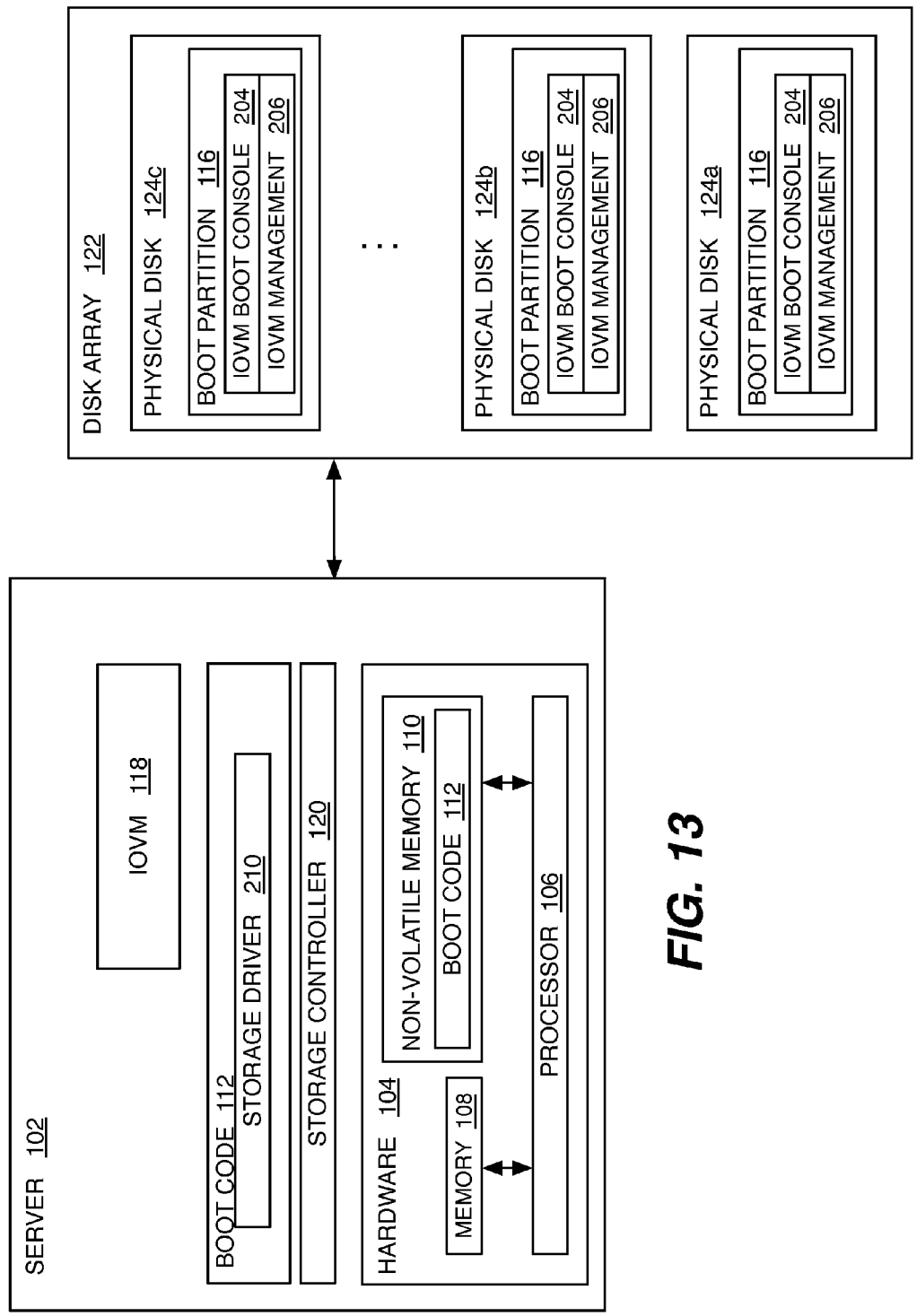
FIG. 13 is a flowchart illustrating an embodiment of a method for booting the virtual storage appliance of FIG. 12.
Figure 14:
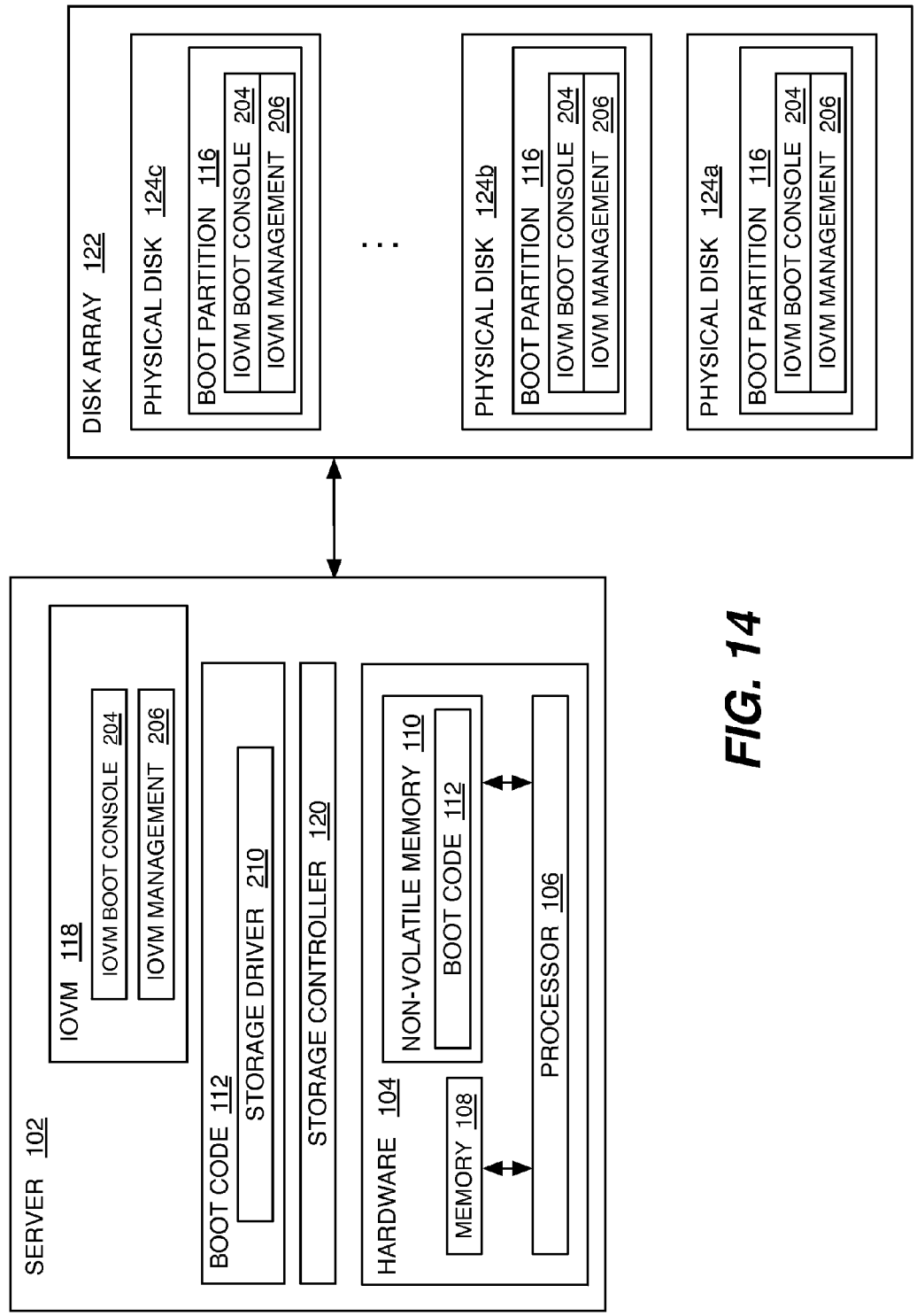
FIGS. 14 and 15 illustrate the operation of the server platform during the booting process of FIG. 12.
Figure 15:
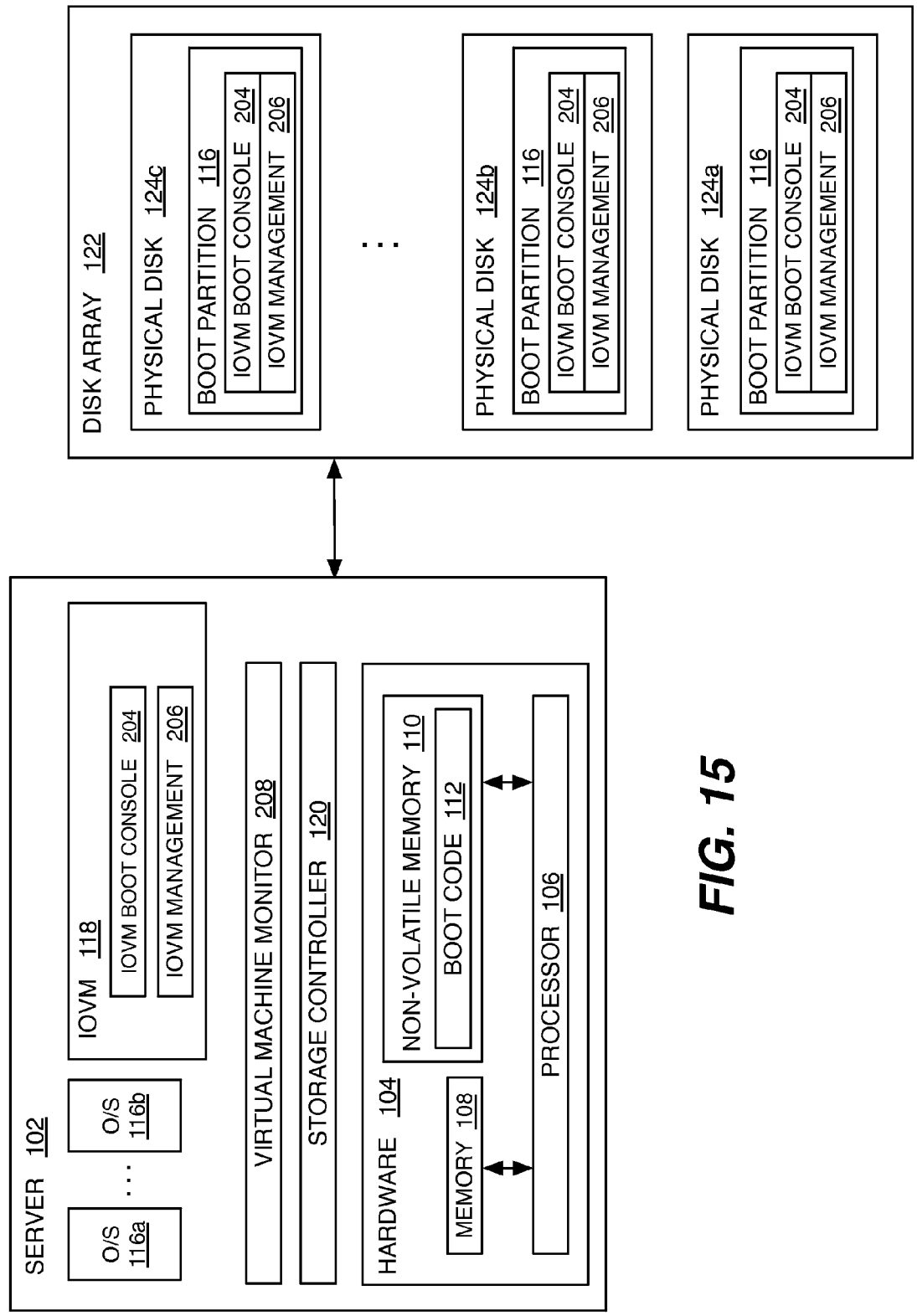

After the IOVM 118 and the virtual environment are installed (in the manner described above or otherwise provided on the server platform 102), the server platform 102 may initiate the start of a boot method. An embodiment of a boot method is illustrated in FIGS. 12-15. FIG. 12 is a flowchart illustrating the operation of the boot method, and FIGS. 13-15 illustrate the boot method with reference to components of the server platform 102 and the disk array 122.

Referring to FIG. 12, at block 1202, a virtual storage appliance is provided on the server platform 102 for managing a disk array. It should be appreciated that the virtual storage appliance may be configured and installed on the computer system 100 in the manner described above regarding the IOVM 118, or otherwise. At block 1204 (FIG. 13), the boot code 112 is loaded. The boot code 112 may be configured to load, for example, a BIOS environment, an EFI environment, or other boot environment. The boot environment may include a standard storage driver 210 compatible with a storage controller 120 on the server platform 102. The boot environment loads and may call a boot loader. At block 1206 (FIG. 14), the IOVM boot console 204 and the IOVM management module 206 are loaded from a hidden partition on one of the physical disks in the disk array 122. As shown at decision block 1208 and block 1210, the IOVM management module 206 may be used to enable a user of computer system 100 to configure and/or manage various aspects of the disk array 122 and/or the IOVM 118. At block 1212 (FIG. 15), the IOVM boot console 204 loads the boot components for the virtual environment. The IOVM boot console 204 starts the boot process. The IOVM boot console 204 accesses the boot disk (e.g., one of the physical disks 124a-124c) and may locate an installed VMM boot loader. In an embodiment, the VMM boot loader may comprise a component integrated with the installed virtualization environment. The VMM boot loader may be part of the O/S installation on a boot volume that is part of the disk array 122. The IOVM boot console 204 boots the VMM 208, as illustrated in FIG. 15, and then passes control to the VMM boot loader in a typical manner, as one of ordinary skill in the art will appreciate.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for installing a virtual storage appliance on a host server platform, the method comprising:
   providing an installation package accessible by a host server platform, the installation package comprising an installation script for installing an I/O virtual machine (IOVM), an IOVM boot console, and an IOVM management module;
   powering up the host server platform and loading boot code;
   loading the installation package to run on top of the boot code;
   running the installation script to create a hidden boot partition on a boot disk and copy the IOVM boot console and the IOVM management module to the hidden boot partition;
   rebooting the host server platform and loading the boot code;
   loading the IOVM boot console and the IOVM management module from the hidden boot partition;
   configuring a disk array via the IOVM management module;
   creating a hidden boot partition, and replicating the IOVM boot console and the IOVM management module, on each disk in the disk array; and
   installing a virtual storage environment using the IOVM boot console as a storage driver.

2. The method of claim 1, wherein the IOVM comprises a guest operating system.

3. The method of claim 1, wherein the IOVM comprises a RAID controller.

4. The method of claim 1, wherein the installation package is provided to the host server platform via at least one of a compact disk, a digital video disk, and a flash memory device.

5. The method of claim 1, further comprising rebooting the host server platform.

6. The method of claim 5, wherein the rebooting the host server platform comprises:
   loading the IOVM boot console and the IOVM management module from the hidden boot partition on one of the disks;
   the IOVM boot console loading the virtual environment.

7. The method of claim 1, wherein the virtualization environment comprises a virtual machine monitor that supports the IOVM and a plurality of virtual machines executing different operating systems.

8. The method of claim 1, wherein the boot code loads one of a BIOS environment or an EFI environment.

9. The method of claim 1, wherein the disk array comprises a hard disk drive array.

10. The method of claim 1, wherein the disk array comprises a storage area network.

11. The method of claim 1, wherein the disk array comprises a RAID array.

12. A method for installing a virtual storage appliance on a host server platform, the method comprising:
   providing an installation package to a host server platform, the installation package comprising an installation script for installing an I/O virtual machine (IOVM), an IOVM boot console, and an IOVM management module;
   running the installation script to create a hidden boot partition on a boot disk and copy the IOVM boot console and the IOVM management module to the hidden boot partition;
   rebooting the host server platform;
   loading the IOVM boot console and the IOVM management module from the hidden boot partition;
   configuring a disk array via the IOVM management module;
   for each disk in the array, creating a hidden boot partition and replicating the IOVM boot console and the IOVM management module; and
   installing a virtual storage environment using the IOVM boot console as a storage driver.

13. The method of claim 12, wherein the IOVM boot console comprises a RAID boot console.

14. The method of claim 12, wherein the configuring the disk array comprises configuring a RAID array.

* * * * *